(12) United States Patent
Archer et al.

(10) Patent No.: US 6,727,428 B2
(45) Date of Patent: Apr. 27, 2004

(54) ELECTRICAL OUTLET BOX

(75) Inventors: John Archer, Cordova, TN (US); Dan Michaelis, Cordova, TN (US); Ron Wright, Gandin, MO (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 10/083,724

(22) Filed: Feb. 25, 2002

(65) Prior Publication Data

US 2002/0117317 A1 Aug. 29, 2002

Related U.S. Application Data

(60) Provisional application No. 60/272,129, filed on Feb. 28, 2001.

(51) Int. Cl.[7] .................................................. H01J 5/00
(52) U.S. Cl. ............................ 174/50; 174/58; 220/3.8; 220/4.02; 439/535; 248/906
(58) Field of Search ............................. 174/48, 50, 58; 220/3.02, 3.8, 4.02; 439/535; 248/906

(56) References Cited

U.S. PATENT DOCUMENTS

| | | | | |
|---|---|---|---|---|
| 4,140,293 A | * | 2/1979 | Hansen | 174/58 X |
| 4,612,412 A | * | 9/1986 | Johnston | 174/58 X |
| 4,844,275 A | * | 7/1989 | Schnell et al. | 220/3.9 |
| 5,354,953 A | | 10/1994 | Nattel et al. | |
| 5,568,362 A | * | 10/1996 | Hansson | 174/50 X |
| 5,594,207 A | * | 1/1997 | Fabian et al. | 174/58 |
| 5,598,998 A | | 2/1997 | Lynn | |
| 5,646,371 A | | 7/1997 | Fabian | |
| 6,147,304 A | * | 11/2000 | Doherty | 174/50 X |

* cited by examiner

*Primary Examiner*—Dhirubhai R Patel
(74) *Attorney, Agent, or Firm*—Hoffmann & Baron, LLP (57) ABSTRACT

An electrical outlet box assembly provides for the accommodation of dual voltage fixtures. The outlet box assembly accommodates electrical fixtures and data fixtures along separate mounting axes. The electrical outlet box assembly provides for increased capacity while meeting applicable code requirements.

16 Claims, 8 Drawing Sheets

ELECTRICAL OUTLET BOX

The present application claims priority to provisional application No. 60/272,129, filed Feb. 28, 2001, and entitled "IMPROVED ELECTRICAL OUTLET BOX".

FIELD OF THE INVENTION

The present invention relates generally to an electrical outlet box for housing electrical fixtures such as a switch or a receptacle. More particularly, the present invention relates to an improved electrical outlet box providing for the accommodation of dual voltage fixtures.

BACKGROUND OF THE INVENTION

It has long been known to house electrical fixtures such as switches and receptacles in an electrical outlet box. The outlet box permits the insertion of electrical wires into the box which are terminated to electrical fixtures. The fixtures then may be mounted to the box which provides protection to the fixtures as well as the wires terminated therein. The outlet box is then mounted to a wall stud at a convenient location to provide access. Most outlet boxes accommodate one or more electrical fixtures which terminate standard 110 volt electrical wires.

It has also become necessary to terminate communications wires for such purposes as data, voice and signal transmission. While terminations are not required to be housed in an electrical box, as are electrical terminations such as switch and receptacles, aesthetics and convenient usage has dictated the need to place the communication terminations in close proximity to the electrical terminations.

The art has developed various boxes and housing which provide for both the accommodation of electrical terminations as well as communication terminations. Examples of outlet boxes which house electrical terminations and also support communication terminations are shown, for example, in U.S. Pat. Nos. 5,354,953; 5,646,371; and 5,598,998. As seen in these patents, the electrical termination is separated from the communications terminations by a solid wall. Typically, this wall is formed by the outside wall of the box which houses the electrical terminations where the electrical terminations are held inboard of the outlet box and the communications terminations are supported outboard of the outlet box.

Common practices and the need to use standard uniform components to cover the outlet box and provide for the ability to readily interconnect to the terminated wires requires that the distance between the electrical termination and the communications termination be fixed. Also, relevant electrical codes dictate the minimum distance that the receptacle need be spaced from the side walls of the outlet box. In the electrical outlet boxes, the art has seen the need to increase the total interior capacity of the box so as to accommodate larger numbers of wires and terminations. With respect to dual voltage boxes, it has become difficult to simultaneously increase the usable interior space of the electrical outlet box while maintaining proper spacing between the electrical termination and the communications termination. Attempts to adjust the receptacle within outlet box may result in the receptacle being positioned either too close to one of the side walls or outside the required distance from the communications termination.

It is, therefore, desirable to provide electrical outlet box which provides increased capacity meets applicable code requirements and which is capable of accommodating dual voltage terminations.

SUMMARY OF THE INVENTION

The present invention relates to a single gang electrical outlet box assembly for accommodating a single electrical fixture such as a switch or receptacle. The outlet box assembly also provides for supporting a communication fixture such as a data plug. The outlet box assembly has a generally rectangular electrical box having a first side wall spaced apart from a second side wall. The pair of spaced apart side walls define a first mounting axis therebetween, the first mounting axis being generally parallel to the first and second side walls and provides for mounting an electrical fixture thereon. A supporting structure for accommodating a communication fixture extends from the first side wall and possesses a second mounting axis which is generally parallel to the first side wall. The first mounting axis for the electrical fixture and the second mounting axis for a communication fixture are substantially equidistant from a center line of the first side wall. The first mounting axis is closer to the first side wall than to the second side wall.

The present invention also provides for a multigang outlet box assembly for accommodating plural electrical fixtures such as switches and/or receptacles and also for supporting a communication fixture such as a data plug. The multigang outlet box assembly has a generally rectangular electrical box having a first side wall spaced apart from a second side wall. The pair of spaced apart side walls supports an electrical fixture therebetween, the fixture being mounted on a first mounting axis adjacent the first sidewall. The rectangular electrical box of the multigang outlet box also provides for a second electrical fixture mounting axis adjacent the second side wall. Both the first and second mounting axes are generally parallel to the first and second side walls. A support structure extends externally from the first side wall of the rectangular electrical box. The support structure is used for accommodating a communication fixture along a third mounting axis, the third mounting axis being generally parallel to the first side wall. The first and third mounting axes are substantially equidistant from a center line of the first side wall. The first mounting access is closer to the first side wall than the second mounting axis is to the second side wall.

The present invention further provides for a single electrical gang outlet box for accommodating an electrical fixture such as a switch, receptacle or the like. The box has a generally rectangular housing having a back wall, a perimetrical side wall extending from said back wall, and an open front face. The back wall, perimetrical side wall, and open front face define a box interior for accommodating a fixture. The perimetrical side wall includes top and bottom walls and opposed side walls. Each of the top and bottom walls includes mounting members for securing a fixture to the housing. The mounting members are aligned along an axis generally parallel to the side walls. This mounting axis is closer to one of the side walls than to the other side wall for off-center mounting of the fixture in the housing interior.

The present invention still further provides for a single gang electrical outlet box assembly for supporting an electrical fixture and a communication fixture. The electrical fixture may be a switch or a receptacle or the like and the communication fixture may be a plug such as a data plug, coaxial connector, or a fiber optic connector. The outlet box has a box interior defined between a first side wall and a second side wall for supporting an electrical fixture within the box interior. A support structure extends from the first side wall for accommodating the communication fixture. The outlet box includes electrical fixture mounting members spaced apart along a first axis between and generally parallel to the first and second side walls. The support structure includes communication fixture mounting members spaced apart along a second axis. The second axis is also parallel to the side walls. The first and second axes are generally equidistant from the first side wall. The first axis, however, is non-centrally located between the first and second side walls.

DETAILED DESCRIPTION OF THE PREFERRED EMBODIMENTS

The dual voltage electrical outlet box assembly 10 of the present invention provides for the accommodation of both electrical fixtures (not shown) such as switches or receptacles and a communication fixture (not shown) such as data plugs, coaxial connectors, fiber optic connectors and the like which provide for termination of voice, data or signal wires.

Figure 1:
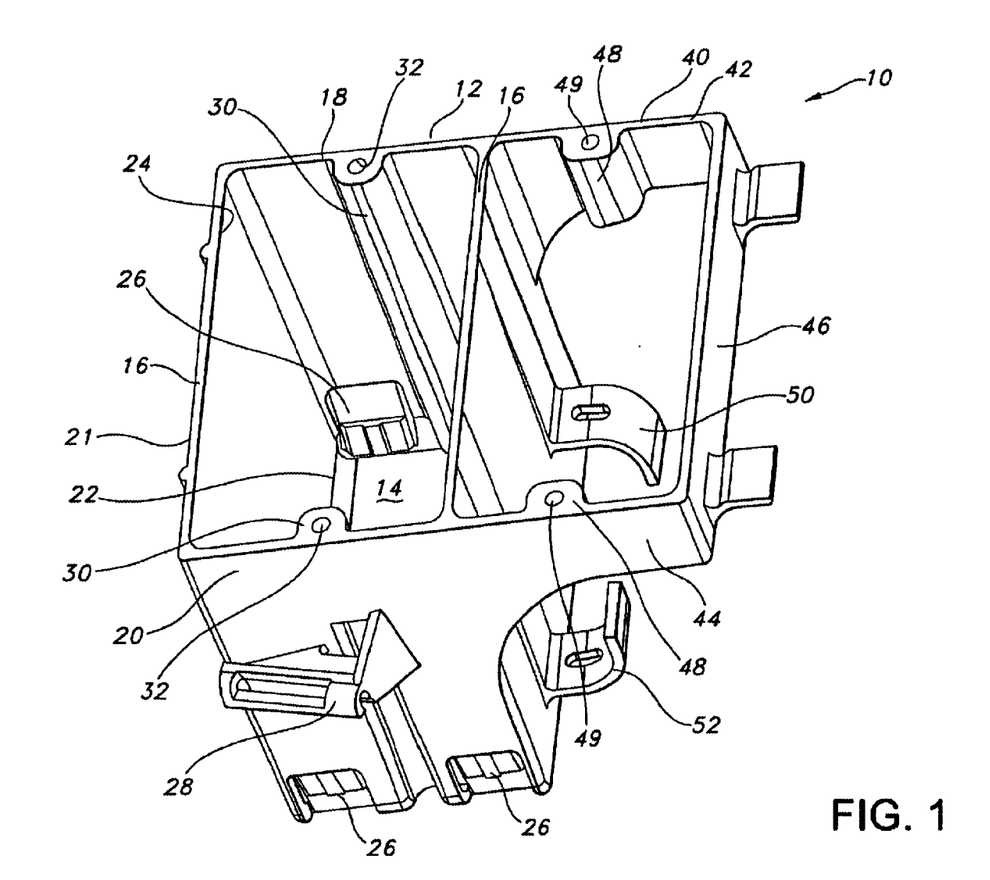
FIG. 1 is a front perspective view of the dual voltage electrical outlet box of the present invention.

Outlet box assembly 10 may be formed of a wide variety of materials as is well known in the art. In the particular example shown herein, box assembly 10 is formed of integrally molded plastic. Box assembly 10 includes an electrical outlet box 12 which is generally a rectangular member having a back wall 14, a pair of spaced apart side walls 16 extending from back wall 14, and opposed top and bottom walls 18 and 20 forming a perimetrical side wall 21. Back wall 14, side walls 16 and top and bottom walls 18 and 20 form a box interior 22 having an open front face 24 which accommodates therein an electrical fixture.

Figure 4:
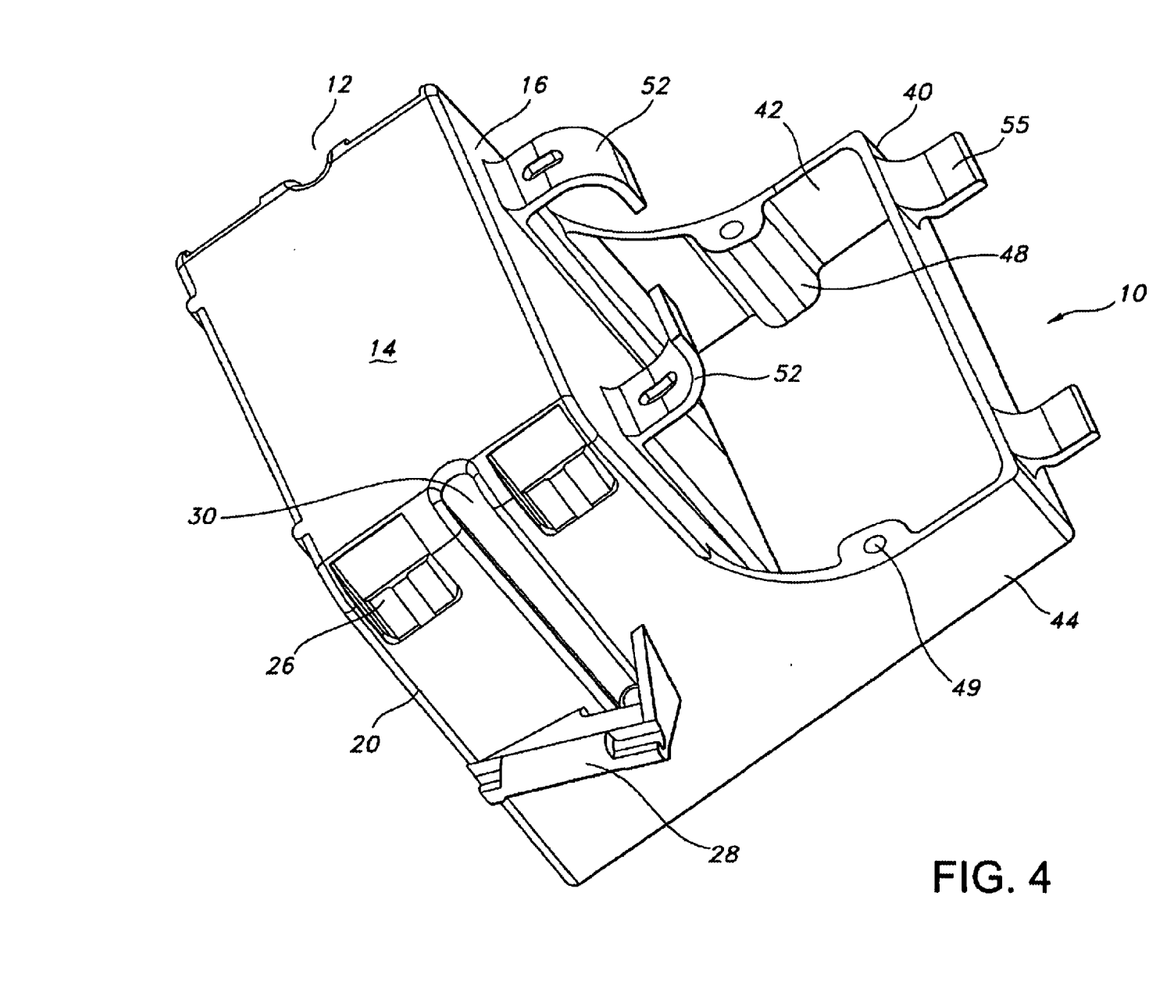
FIG. 4 is rear perspective showing of the dual voltage outlet box of FIG. 1.

As is well known in the art, outlet box 12 may include one or more access openings 26 which permit entry of electrical wires and cables (not shown) into box interior 22. The exterior surfaces of top and bottom walls 18 and 20 may include mounting flanges 28 which allow the box to be secured to a building stud or the like in convention fashion by use of a fastener such as a nail or screw. Top and bottom walls 18 and 20 include opposed inwardly directed mounting elements 30 each having a central screw threaded aperture 32 therethrough. The mounting elements 30 permit the attachment of electrical fixtures within the interior 22 of box 12 in convention fashion. The location of mounting elements 30 and the screw threaded aperture 32 will be described in further detail hereinbelow.

Figure 2:
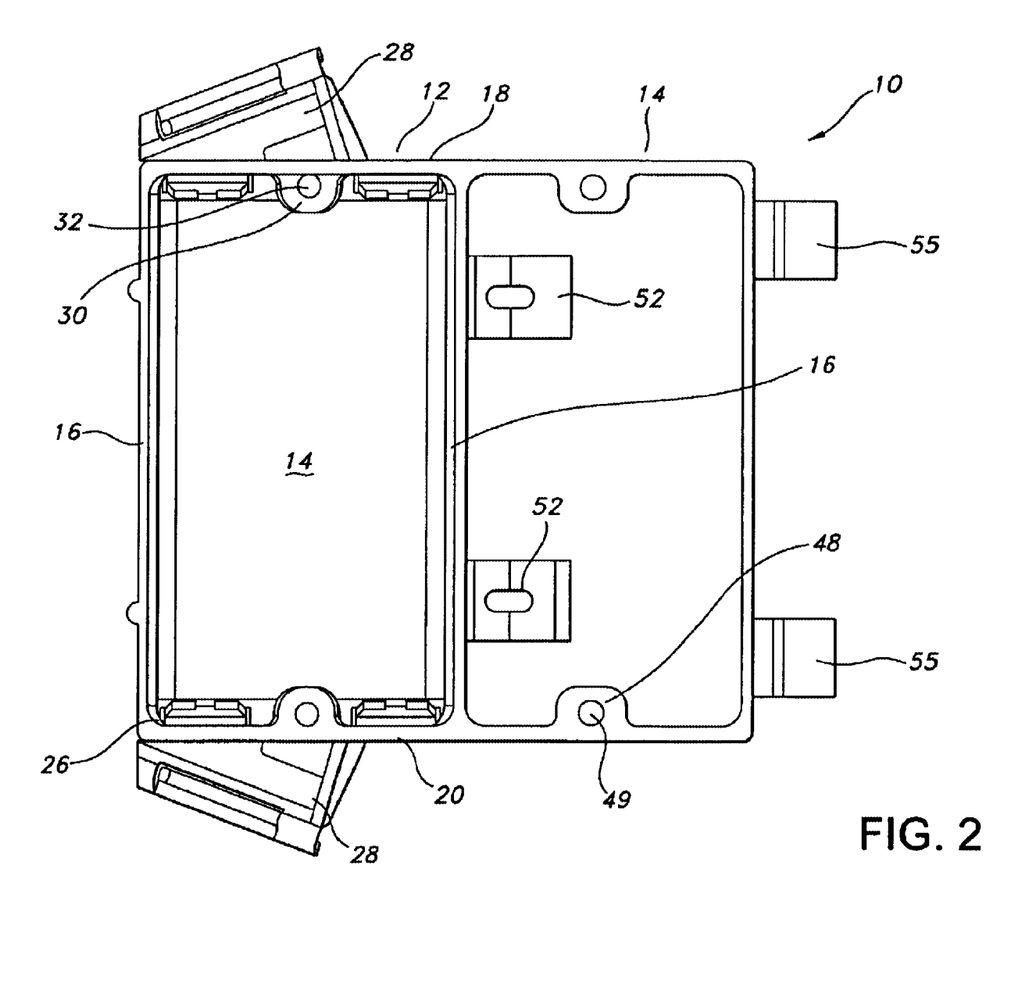
FIG. 2 is a front plan view of the dual voltage box of FIG. 1.
Figure 3:
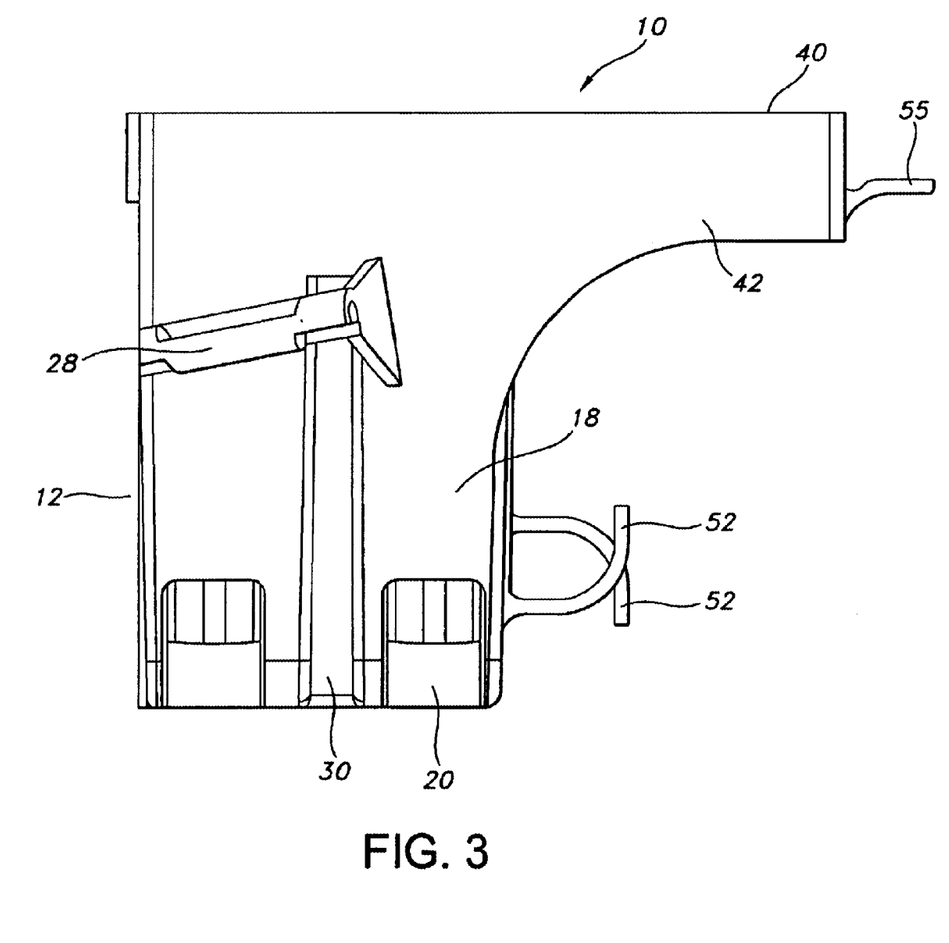
FIG. 3 is a side elevational showing of the dual voltage box of FIG. 1.

Box assembly 10 further includes an externally supported frame 40 attached to one side wall 16 of box 12. Frame 40 is generally rectangular and is positioned in flush relationship with the open front face 24 of box 12. Frame 40 includes opposed upper and lower spaced apart legs 42 and 44 and a joining strut 46 extending between the distal ends of legs 42 and 44. The upper and lower legs 42 and 44 along with strut 46 and adjacent side walls 16 of box 12 define the rectangular frame 40. The upper and lower legs 42 and 44 of frame 40 include mounting elements 48 which are inwardly directed and include screw threaded apertures 49. The mounting elements 48 and screw threaded apertures 49 permit accommodation of a face plate (not shown) which supports a communications termination device generally centrally located within frame 40.

Side walls 16 further include outwardly directed cable holding flanges 50 and 52 which extend within the interior defined by frame 40. Cable holding flanges 50 and 52 are designed to accommodate and support communications wires prior to termination to the communication terminations. Also, strut 46 supports a pair of outwardly extending tabs 55 for supporting the wallboard within which assembly 12 is positioned.

Figure 7:
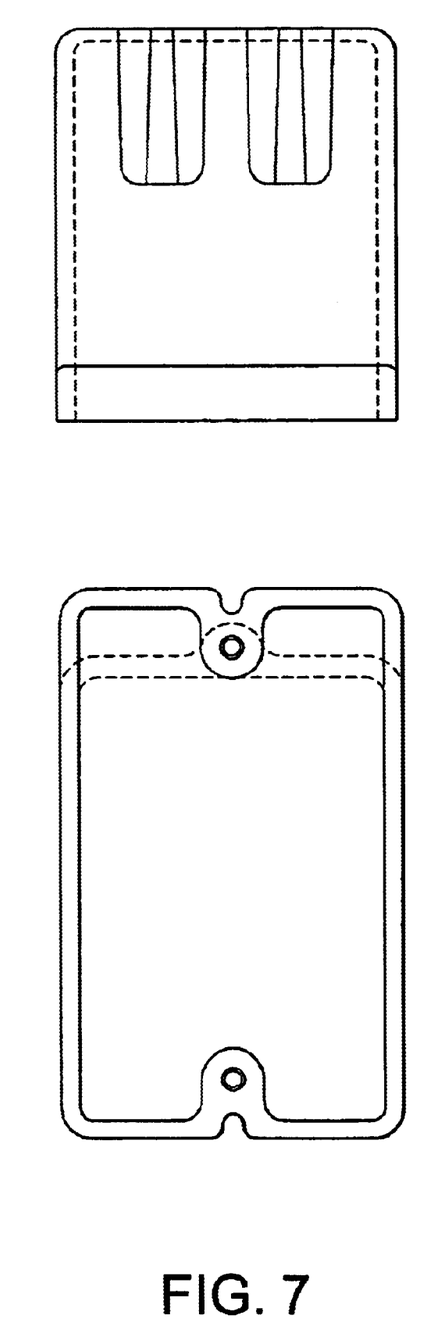
FIG. 7 is a schematic of a single gang outlet box showing certain dimensions standardized by the National Electric Code.
Figure 8:
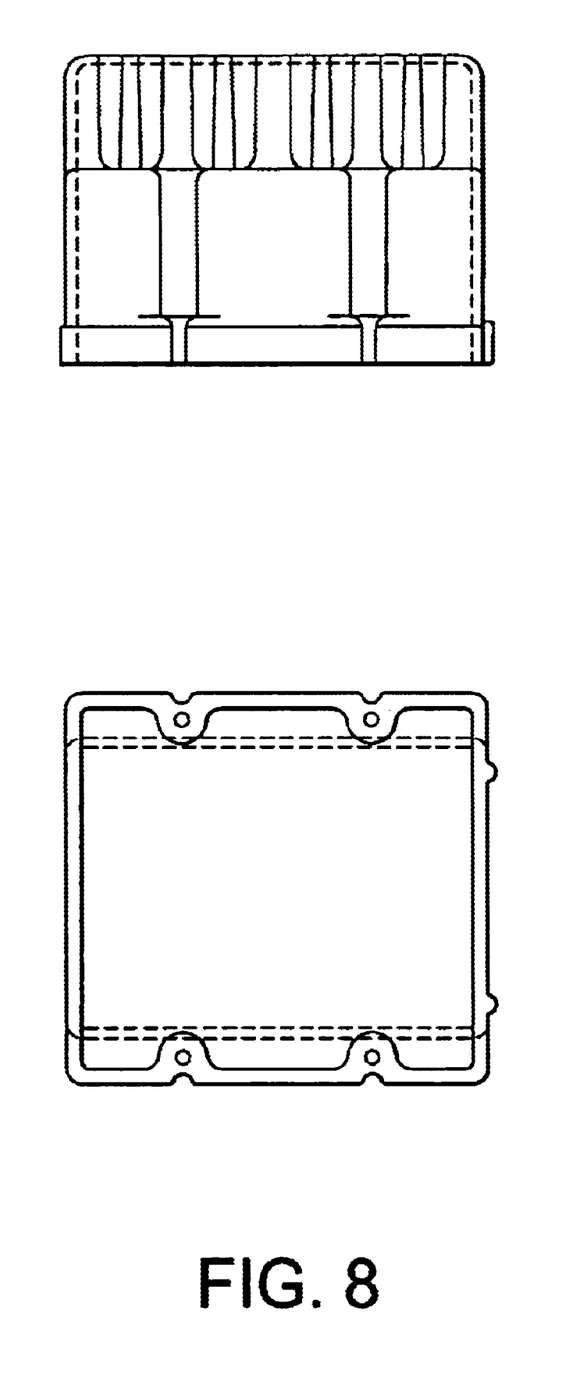
FIG. 8 is a schematic of a multiple gang outlet box showing certain dimensions standardized by the National Electric Code.

The manner in which box assembly 10 support electrical termination devices as well as communication termination devices and the ability to support an appropriate cover thereover is shown in further detail in U.S. Pat. No. 5,354,953, issued Oct. 11, 1994, and entitled "Cable Holding Device", the disclosure of which is incorporated herein for all purposes. As is particularly shown in the '953 patent, the plate placed over the outlet box provides access to a duplex receptacle as well as a data jack. As a conventional cover is placed thereover, the center line of the duplex connector as well as the center line of the data plug must be spaced apart a fixed distance. Furthermore, with regard to the outlet box portion 12 of box assembly 10, certain distance requirements are dictated by applicable codes. These distances are shown in FIG. 7 with respect to a single gang box and in FIG. 8 with respect to a multiple gang outlet box.

Figure 5:
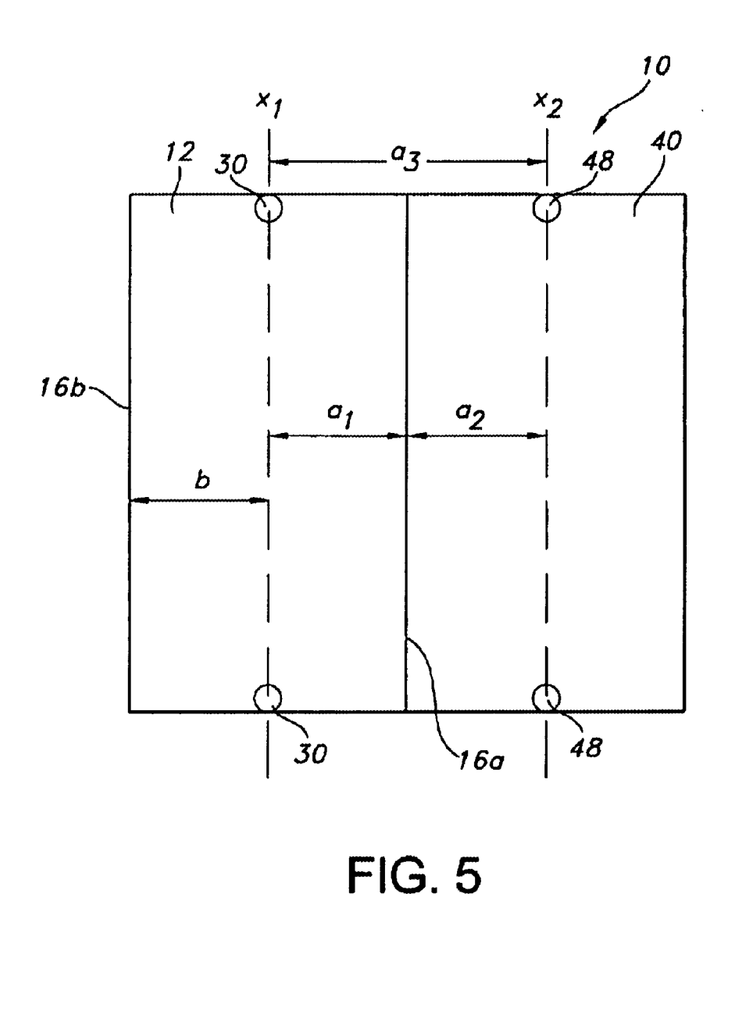
FIGS. 5 and 6 are schematic representations of single gang and multiple gang outlet box of the present invention.

Referring now to FIG. 5, the ability of the present invention to provide an outlet box assembly 10 for accommodating electrical fixtures so that the outlet box has an extended capacity, yet meet the conventional requirements dictated by applicable codes and accommodate the conventional requirements of power/communication terminations are shown schematically with respect to FIG. 5.

Box 12 is represented by the left-hand rectangle while frame 40 is represented by the right-hand rectangle. The arrangement of the mounting elements 30 of box 12 and mounting elements 48 of frame 40 is such that vertical mounting axes and $x_1$ and $x_2$ are defined. The distance between the mounting axes denoted as $a_3$ is fixed based upon the requirements of components such as cover plates which must be placed over the mounted electrical fixtures as well as the communication fixtures. In order to provide an expanded interior for box 12, mounting axis $x_1$ of box 12 is positioned closer to common wall $16a$ than the opposed side wall $16b$. Thus, as shown in FIG. 5, $a_1$ is less than b. However, as required by the dictates of, for example, the cover plate, common wall $16b$ must be equidistant between both mounting axes $x_1$ and $x_2$ such that $a_1$ is equal to $a_2$, and $a_1+a_2=a_3$. Common wall $16b$ is defined as being generally equidistant between the mounting axes $x_1$ and $x_2$. However, as may be appreciated, the common wall $16b$ has a certain thickness. Manufacturing tolerances may be such that due to variations in the thickness of the wall, one surface of the wall may be closer to one of the axes than the other surface is to its adjacent axis. However, absent such manufacturing tolerances, the present invention provides for the common wall to be generally equidistant between the two mounting axes. As used herein throughout, the phrase "generally equal" or "generally or substantially equidistant" takes into consideration such manufacturing tolerances.

The axes $x_1$ and $x_2$ must be maintained at a certain minimum distance from common wall 16a. Axis $x_1$ must also be a fixed distance from axis $x_2$. Therefore, increased interior volume of box 12 is accommodated by extending the distance between axis $x_1$ and the opposite side wall 16b. Thus, axis $x_1$ and, therefore, the mounting apertures which define the axis, is off-centered with respect to box 12, the axis being closer to one side wall than the side wall.

Figure 6:
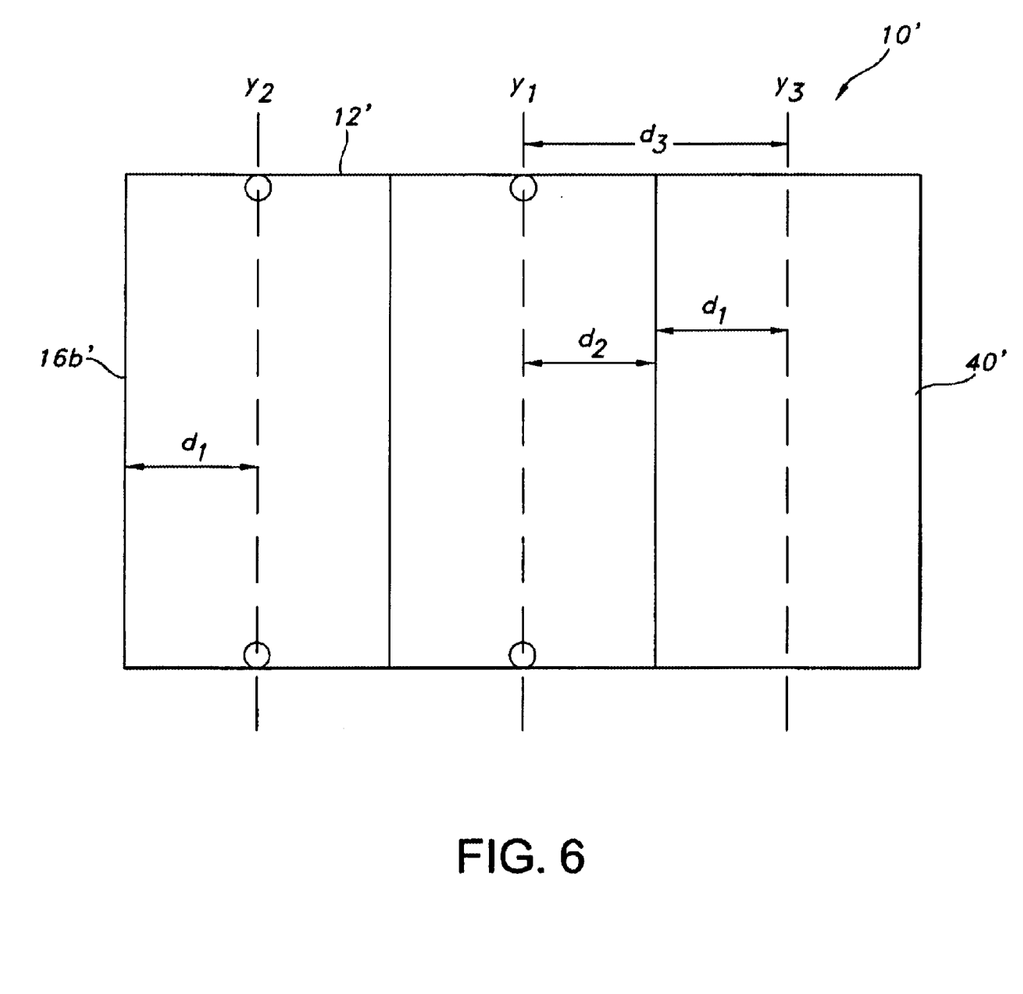

Referring now to FIG. 6, the present invention may be practiced in a multi-gang box configuration. A multi-gang box assembly 10' includes an outlet box 12' and frame 40'. Box 12' accommodates two electrical fixtures and is defined by a pair of side walls 16a' and 16b'. As with the embodiment of FIG. 5, mounting axes $y_1$ and $y_2$ are defined for mounting a pair of electrical fixtures. Frame 40' is defined by the right-hand rectangle outboard of side wall 16a'. A mounting axis $y_3$ is defined with frame 40. As with the embodiment of FIG. 5, side wall 16a' is located substantially equidistant between mounting axes $y_1$ and $y_3$. In order to provide extra capacity for box 12', mounting axis $y_2$ is positioned so that its distance $d_4$ from its adjacent side wall 16b' is greater than $d_2$, the distance of mounting axis $y_1$ from its respective side wall 16a'.

Having described the particular embodiments of the invention herein, it should be appreciated that modifications may be made thereto without departing from the contemplated scope of the invention. Accordingly, the embodiments described herein are intended to be illustrative rather than limiting, the true scope of the invention being set forth in the claims appended hereto.

What is claimed is:

1. A single gang electrical outlet box assembly for accommodating a single electrical fixture and for supporting a communication fixture, said assembly comprising:

a generally rectangular electrical box having a first side wall spaced apart from a second side wall, said first and second side walls defining a first mounting axis therebetween generally parallel to said side walls for mounting said electrical fixture; and a supporting structure extending from said first side wall for accommodating a communication fixture along a second mounting axis generally parallel to said first side wall;

said first and second mounting axes being substantially equidistant from a centerline of said first side wall, with said first mounting axis being closer to said first side wall than said second side wall.

2. An outlet box according to claim 1 wherein said electrical box further comprises a back wall extending between said first and second side walls.

3. An outlet box according to claim 2 wherein said electrical box further comprises a top wall and a bottom wall connecting said first and second side walls.

4. An outlet box according to claim 2 wherein said back wall further includes access openings adjacent said first and second side walls.

5. An outlet box according to claim 3 wherein said top and bottom walls further include mounting flanges an an exterior surface of said top and bottom walls.

6. An outlet box according to claim 1 wherein said electrical fixture is selected from the group consisting of switches and receptacles.

7. An outlet box according to claim 1 wherein said communication fixture is selected from the group consisting of data plugs, coaxial connector, and fiber optic connectors.

8. An outlet box assembly according to claim 1 wherein said upper and lower legs further comprise mounting elements located along said second mounting access.

9. An outlet box according to claim 1 wherein said first side wall further comprises cable holding flanges.

10. A multigang outlet box assembly for accommodating plural electrical fixtures and for supporting a communication fixture, said assembly comprising:

a generally rectangular electrical box having a first side wall spaced apart from a second side wall for supporting said fixtures therebetween, said electrical box defining a first electrical fixture mounting axis adjacent said first side wall and a second electrical fixture mounting axis adjacent said second side wall, each of said fixture mounting axes being generally parallel to said side walls; and a support structure external of said first side wall for accommodating a communication fixture along a third mounting axis generally parallel to said first side wall;

said first and third mounting axis being substantially equidistant from a central line of said first side wall, with said first mounting axis being closer to said first side wall than said second mounting axis is to said second side wall.

11. A multigang outlet box assembly according to claim 10, wherein said electrical box further comprises a back wall extending between said first and second side walls.

12. A multigang box according to claim 11, wherein said back wall further comprises a top wall and a bottom wall connecting said first and second side walls.

13. A multigang box according to claim 12, wherein said top and bottom walls further including mounting flanges on an exterior surface of said top and bottom walls.

14. A multigang box according to claim 11, wherein said back wall further includes access openings adjacent said first and second side walls.

15. A multigang box according to claim 10, wherein said electrical fixture is selected from the group consisting of switches and receptacles.

16. A multigang outlet box according to claim 10, wherein said communication fixture is selected from the group consisting of data plugs, coaxial connector, and fiber optic connectors.

* * * * *

UNITED STATES PATENT AND TRADEMARK OFFICE
CERTIFICATE OF CORRECTION

PATENT NO. : 6,727,428 B2
DATED : April 27, 2004
INVENTOR(S) : Archer et al.

Page 1 of 1

It is certified that error appears in the above-identified patent and that said Letters Patent is hereby corrected as shown below:

Column 5,
Lines 43-66, delete "...second mounting axis generally parallel to said first side wall; said first and second mounting axes being substantially equidistant..." and insert -- ...communication fixture along a second mounting axis generally parallel to said first side wall; said supporting structure further comprises an upper leg spaced apart from a lower leg, said upper and lower legs connecting said first side wall to a joining strut extending between distal ends of said upper and lower legs; said first and second mounting axes being substantially equidistant... --.

Column 3,
Lines 54 and 60, delete "...in convention fashion..." and insert -- in conventional fashion... --.

Column 6,
Line 2, delete "...flanges an an exterior..." and insert -- flanges on an exterior --.
Line 31, delete "...first and third mounting axis..." and insert -- first and third mounting axes --.

Signed and Sealed this

Thirtieth Day of November, 2004

JON W. DUDAS
*Director of the United States Patent and Trademark Office*